(12) United States Patent
Galal et al.

(10) Patent No.: US 8,892,619 B2
(45) Date of Patent: Nov. 18, 2014

(54) FLOATING-POINT MULTIPLY-ADD UNIT USING CASCADE DESIGN

(75) Inventors: Sameh Galal, Stanford, CA (US); Mark Horowitz, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 346 days.

(21) Appl. No.: 13/556,710

(22) Filed: Jul. 24, 2012

(65) Prior Publication Data

US 2014/0188966 A1    Jul. 3, 2014

(51) Int. Cl.
*G06F 7/485* (2006.01)
*G06F 7/487* (2006.01)

(52) U.S. Cl.
CPC .............. *G06F 7/4876* (2013.01); *G06F 7/485* (2013.01)
USPC ........................................................ 708/501

(58) Field of Classification Search
None
See application file for complete search history.

(56) References Cited

U.S. PATENT DOCUMENTS

| | | | |
|---|---|---|---|
| 6,842,765 B2 | 1/2005 | Enenkel et al. | |
| 6,904,446 B2 | 6/2005 | Dibrino | |
| 8,037,118 B2 | 10/2011 | Quinnell et al. | |
| 8,239,440 B2 * | 8/2012 | Brooks et al. | 708/501 |
| 8,499,017 B2 * | 7/2013 | Penton et al. | 708/203 |
| 8,626,813 B1 * | 1/2014 | Swartzlander et al. | 708/501 |
| 8,671,129 B2 * | 3/2014 | Brooks et al. | 708/521 |
| 2008/0256161 A1 | 10/2008 | Quinnell et al. | |
| 2009/0248779 A1 * | 10/2009 | Brooks et al. | 708/523 |
| 2011/0040815 A1 * | 2/2011 | Penton et al. | 708/205 |
| 2011/0072066 A1 * | 3/2011 | Lutz | 708/497 |
| 2011/0137970 A1 * | 6/2011 | Dockser et al. | 708/501 |
| 2011/0231460 A1 | 9/2011 | Ahmed | |
| 2014/0122555 A1 * | 5/2014 | Hickmann et al. | 708/523 |
| 2014/0188966 A1 * | 7/2014 | Galal et al. | 708/501 |

OTHER PUBLICATIONS

Boersma et al., "The POWER7 Binary Floating-Point Unit," in Computer Arithmetic (ARITH), 2011 20th IEEE Symposium on (Jul. 2011), pp. 87-91.
Brunie et al., "A mixed-precision fused multiply and add," Signals, Systems and Computers (ASILOMAR), 2011 Conference Record of the Forty Fifth Asilomar Conference on Date of Conference: Nov. 6-9, 2011, 165-169.

* cited by examiner

*Primary Examiner* — David H Malzahn
(74) *Attorney, Agent, or Firm* — Lumen Patent Firm

(57) ABSTRACT

A floating-point fused multiply-add (FMA) unit embodied in an integrated circuit includes a multiplier circuit cascaded with an adder circuit to produce a result A*C+B. To decrease latency, the FMA includes accumulation bypass circuits forwarding an unrounded result of the adder to inputs of the close path and the far path circuits of the adder, and forwarding an exponent result in carry save format to an input of the exponent difference circuit. Also included in the FMA is a multiply-add bypass circuit forwarding the unrounded result to the inputs of the multiplier circuit. The adder circuit includes an exponent difference circuit implemented in parallel with the multiplier circuit; a close path circuit implemented after the exponent difference circuit; and a far path circuit implemented after the exponent difference circuit.

9 Claims, 7 Drawing Sheets

FLOATING-POINT MULTIPLY-ADD UNIT USING CASCADE DESIGN

STATEMENT OF GOVERNMENT SPONSORED SUPPORT

This invention was made with Government support under contract HR0011-10-3-0002 awarded by DARPA. The Government has certain rights in this invention.

FIELD OF THE INVENTION

The present invention relates generally to integrated circuits containing floating-point multiply-add units. More specifically, it relates to improved fused multiply-add units having a cascade design.

BACKGROUND OF THE INVENTION

A high performance floating-point unit (FPU) is a major component of modern central processing unit (CPU) and graphical processing unit (GPU) designs. Its applications range from multimedia and 3D graphics processing to scientific and engineering applications. Most recent designs incorporate an integrated multiply-accumulate unit due to the frequency of multiply-accumulation operations, such as those found in dot products and matrix multiplication. These multiply-accumulate units usually implement the fused multiply add operation (FMA) which is part of the IEEE floating-point arithmetic standard, IEEE741-2008. The standard defines fusedMultiplyAdd(A, C, B) as the operation that computes (A×C)+B initially with unbounded range and precision, rounding only once to the destination format. As a result, fused multiply-add has lower latency and higher precision than a multiplication followed by an addition.

FMA units reduce latency by performing alignment of the addend significand ($S_B$) in parallel with the multiplication tree of the other two significands, $S_A$ and $S_C$. Furthermore, the multiplier output is kept in carry save format and added to the aligned addend, thereby saving one extra add operation. However, since the addend's exponent might be smaller or larger than, the sum of multiplicands' exponents, the addend significand can be shifted from all the way to the left of the multiplier result to all the way to the right, requiring the datapath to have wide shifters and adders. Another problem with traditional FMA design is that it does not make a distinction between the latency of accumulation and multiply-add, resulting in designs that have equal latencies for all dependencies. In view of the above, there is a need in the art for improved FMA units.

SUMMARY OF THE INVENTION

The present invention provides optimized designs of FPUs that are especially useful in CPUs, which are more latency sensitive than GPU designs. For such latency sensitive applications, the present inventors have developed a cascade design that optimizes a number of parameters, resulting in very low effective latency between operations with a sum dependence. The cascade FMA (CMA) design is optimized for accumulation dependencies with a small effect on the other latencies. CMA allows the accumulation operand to enter the pipeline much later than in a traditional FMA implementation, allowing for shorter accumulation latency. This path is then optimized by introducing overlapping bypass paths for exponent and significand to make the accumulation dependent latency as short as possible. The reduction in latency depends on two main optimizations: forwarding of unrounded results and tightening the accumulation bypass path by staggering the exponent and mantissa datapath of the adder. Building and synthesizing the design reveals it does not incur area or energy overheads over existing FMA designs.

The present invention thus provides a floating-point fused multiply-add (FMA) unit which may be implemented in a CPU. The FMA unit has aggressively reduced accumulation latency using tight accumulation feedforward loop using exponent and mantissa staggered feedback and feedforward of unrounded result. The design has reduced accumulation latency of traditional FMA designs and total system improvement with no energy or area overhead. Additional 20% energy savings are achieved through clock gating of parallel mututally exclusive datapath elements in the cascade implementation, where only the datapath which is muxed into the output is clocked.

In some embodiments, the cascade design may be used with wider output accumulator with double the precision of the input with minor modification Key features of embodiments of the invention include:
1) Modification of far-close path adder design to the requirements of FMA including the moving of exponent difference out of the far path
2) forwarding of unrounded results in the adder to lower latency
3) earlier forwarding of exponent result in carry save format to shorten exponent latency In one aspect, a floating-point fused multiply-add (FMA) unit embodied in an integrated circuit is provided. The FMA includes a multiplier circuit with floating point inputs A and C and floating point output A*C; and an adder circuit connected to the output of the multiplier circuit, wherein the adder circuit adds the floating point output A*C to a floating point input B producing a result A*C+B. The adder circuit includes an exponent difference circuit implemented in parallel with the multiplier circuit; a close path circuit implemented after the exponent difference circuit; a far path circuit implemented after the exponent difference circuit; a 2:1 Mux circuit connected to outputs of the close path circuit and the far path circuit; and a rounder circuit connected to an output of the 2:1 Mux circuit. The FMA also includes accumulation bypass circuits forwarding an unrounded output of the 2:1 Mux circuit to inputs of the close path circuit and the far path circuit, and forwarding an exponent result in carry save format to an input of the exponent difference circuit. The exponent result includes two components. A first component of the exponent result is an output of the 2:1 mux that selects the larger exponent between ExpAC and ExpB. The second component of the exponent result is an output of 2:1 mux that selects between an inverted version of leading zero anticipator output if the result is forwarded from the close path circuit and zero if the result is forwarded from the far path circuit. Also included in the FMA is a multiply-add bypass circuit forwarding the unrounded output of the 2:1 Mux circuit to the floating point inputs A and C of the multiplier circuit. The floating point output A*C has a mantissa width double that of A and of C, and the floating point output A*C has a mantissa width double that of B.

Preferably, the accumulation bypass circuits are staggered with respect to each other such that the exponent datapath starts earlier than the mantissa datapath and an exponent result is calculated earlier than a mantissa result in carry save format to be forwarded for a next dependent calculation. In embodiments of the FMA unit, the far path circuit may combine incrementation with shifting and addition datapath. The unrounded output is right padded with ones in case of incrementation before being fed to a shifter or adder, and circuitry in the adder circuit uses carry propagation as if the unrounded result had been incremented before shifting and addition.

In embodiments of the FMA unit, the adder circuit may include a clock gating circuit to choose between the close path circuit and the far path circuit. The clock gating is performed on the far path if there is a subtraction and the exponent difference is 0 or 1, and clock gating is performed on the close path if the exponent difference is greater than 1 or there is an addition.

DETAILED DESCRIPTION

Floating point multiplication followed by separate floating point addition is often made more efficient through the use of a conventional FMA architecture that performs the multiplication tree of $S_A$ and $S_C$ in parallel with the alignment with $S_B$, followed by addition of three terms (two from the multiplication tree and $S_B$), normalization and rounding. This FMA reduces latency and rounding error compared to separate multiplication followed by addition. In a cascaded FMA, a multiply-add is computed by simply cascading the two functional elements. However, because of the requirement of unlimited precision for intermediate results of FMA instructions, the multiplier and adder are not standard floating point adders/multipliers but are customized. For example, a double precision CMA design contains the following stages:

A multiplier that takes 2 double-precision operands A,C to generate the result A×C in "quad" precision (106 bit mantissa, 13 bit exponent)

An asymmetric adder that takes a double precision operand B and the "quad" precision multiplier output to produce a double-precision result (A×C)+B.

Thus, CMA is just an implementation variant of FMA that produces exactly the same result for FMA instructions with unlimited intermediate precision and rounding only once at the end. The conventional CMA implementation of FMA also includes a multiply bypass, i.e., feedforward of unrounded results to the input of the multiplier.

Figure 1:
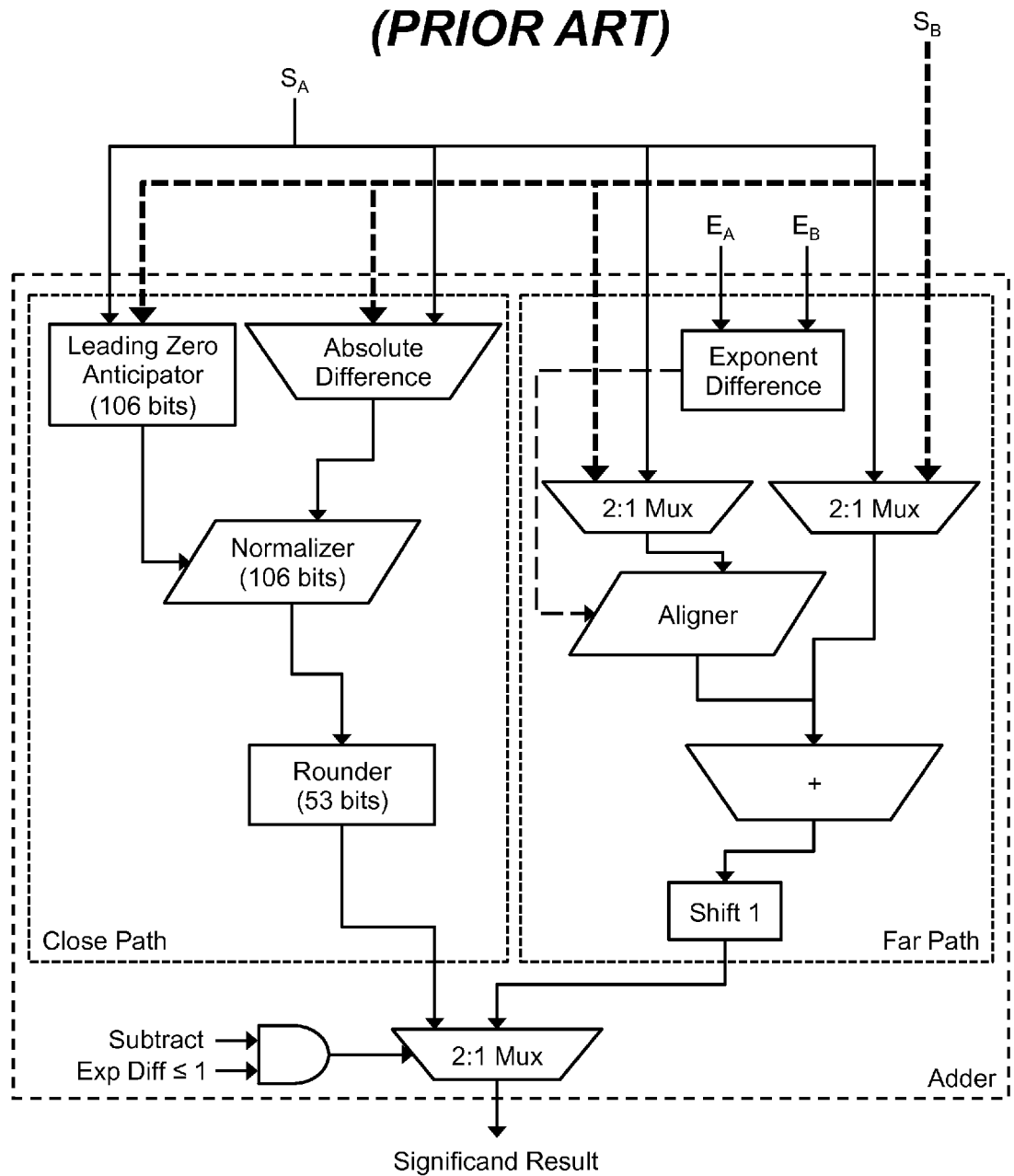
FIG. 1 is a block diagram of the datapath of the adder part of a conventional cascaded FMA design.
Figure 2:
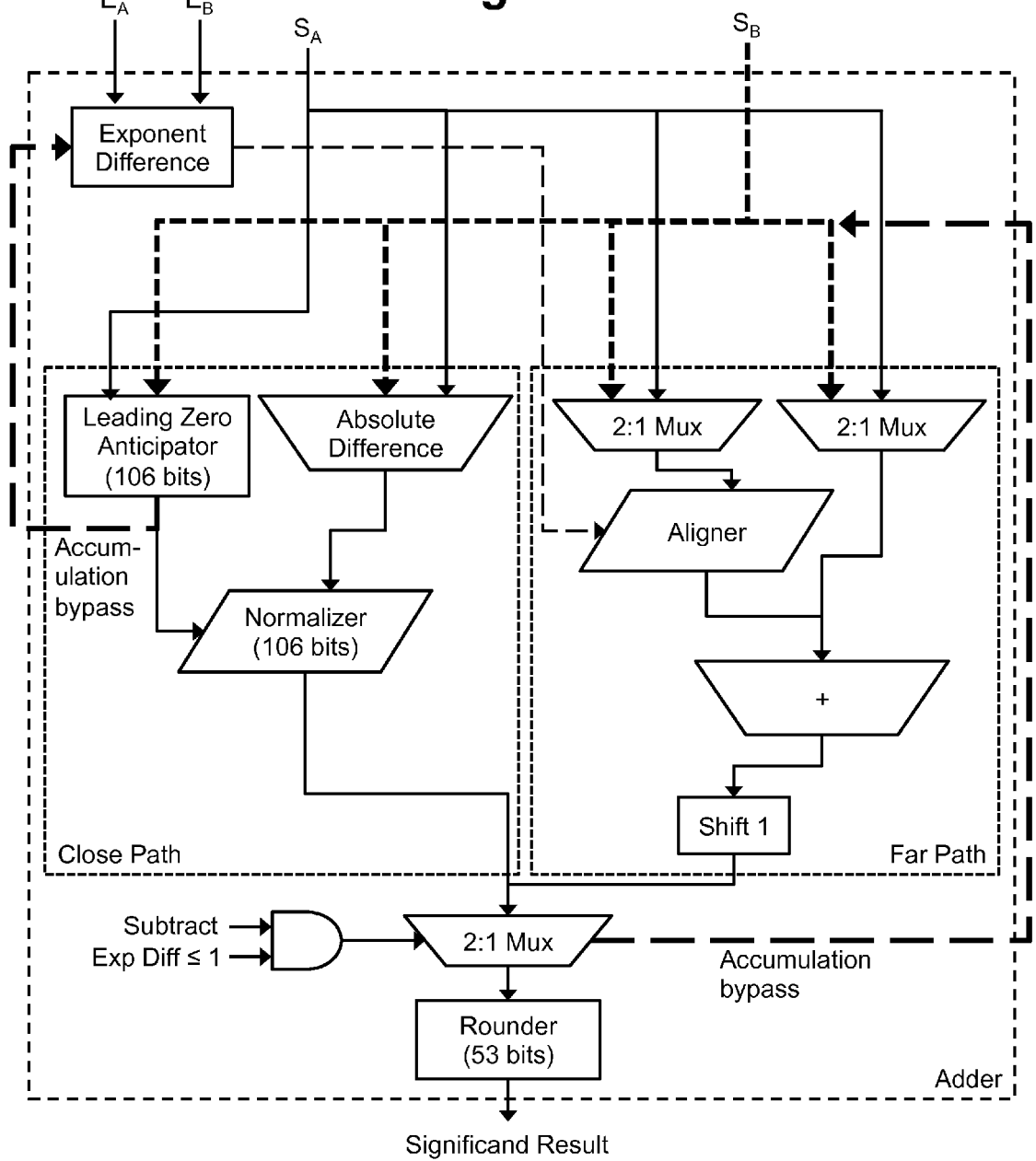
FIG. 2 is a block diagram of the datapath of the adder part of an FMA design according to an embodiment of the present invention.

FIG. 1 is a block diagram of the datapath of the adder part of a conventional cascaded FMA design. There are, however, undesirable latencies in this traditional cascaded FMA design. Consequently, the cascaded FMA design is not frequently used. The present inventors, however, have discovered novel cascaded FMA designs with reduced latency. FIG. 2 is a block diagram of the datapath of the adder part of an FMA design according to an embodiment of the present invention.

As with a conventional cascaded FMA, in this design first performed is multiplication of A and C whose mantissa width is N by combining the multiplier tree results using an adder producing product of width 2N. A special adder that can take a number with mantissa of 2N width (the product) and a number of N width (the addend) follows to produce the result. The two designs, however, differ in several important ways. Embodiments of the present invention include several optimizations of this cascaded design including the following:

1) The design of FIG. 1 has the exponent different positioned within the far path, in parallel with the close path of the adder. The design of FIG. 2, in contrast, has the exponent difference unit positioned earlier than both close and far paths, so that it is performed in parallel with the multiplier (see FIG. 3).

2) In contrast with the design of FIG. 1, the design of FIG. 2 has a forwarding path for unrounded results of the adder, i.e., an accumulation bypass from the output of the 2:1 Mux back to the inputs of the close path and the near path. Notably, the conventional CMA implementation of FMA has only multiplication bypass but no accumulation bypass.

3) In contrast with the design of FIG. 1, the design of FIG. 2 has an exponent feed-forward that is staggered with respect to the mantissa feed-forward, i.e., an accumulation bypass from the output of the leading zero anticipator (LZA) back to the exponent difference. This forwarded exponent is shown in the figure for the close path. The forwarded exponent is ExpB or ExpAC—NumberOfLeadingZero which is the LZA output and as the such the dashed feedback is exponent forwarding. The LZA output is used in normalization and forwarding for exponent datapath.

Embodiments also include exponent forwarding in the far path (not shown in figure), forwarding the bigger exponent of ExpAC or ExpB with slight modification of +/−1.

4) The design of FIG. 2 also preferably includes a modified scheduler for scheduling mul, add, FMA instructions.

These optimizations will be described in further detail below.

Figure 3:
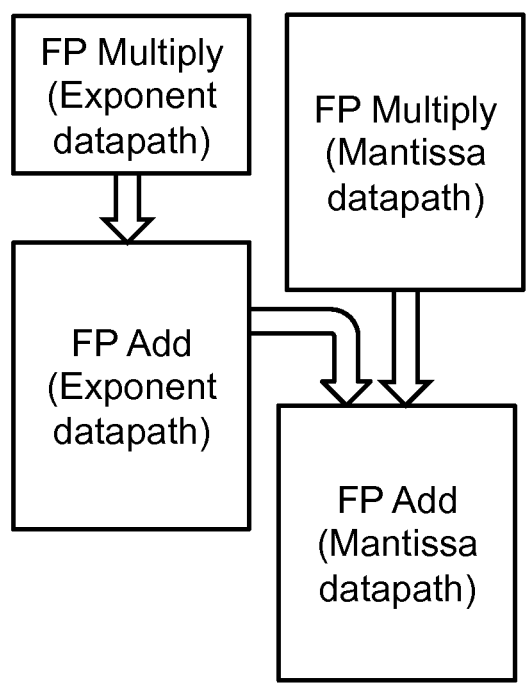
FIG. 3 is a block diagram illustrating the staggered timing of the exponent and mantissa datapaths of the CMA FMA design according to an embodiment of the present invention.

FIG. 3 is a block diagram illustrating the staggered timing of the exponent and mantissa datapaths of the CMA FMA design according to an embodiment of the present invention. The mantissa datapath is architected to start operation after the exponent difference is found, resulting in overlapping bypass loops of the exponent datapath and mantissa datapath. This late mantissa datapath design has several advantages. First, the exponent difference is done in parallel with the multiplication, removing the exponent difference stage from the critical path between the multiplier and adder; thereby shortening the total latency of CMA design. Second, the critical path for an accumulation dependent instruction is improved from 4 cycles to 3 cycles without noticeably affecting the latency of independent instructions. Finally, since exponent difference is performed first, power optimizations such as fine-grained clock gating of the far/near path of the adder based on exponent difference can be introduced. Clock gating based on exponent difference signal can provide sizable power saving. In a traditional close/far path architecture, the exponent subtraction happens in the far path. In the present design, on the other hand, the exponent difference is moved first because the rounding part is used for both the close and far path which is not the case in the traditional adder.

Figure 4:
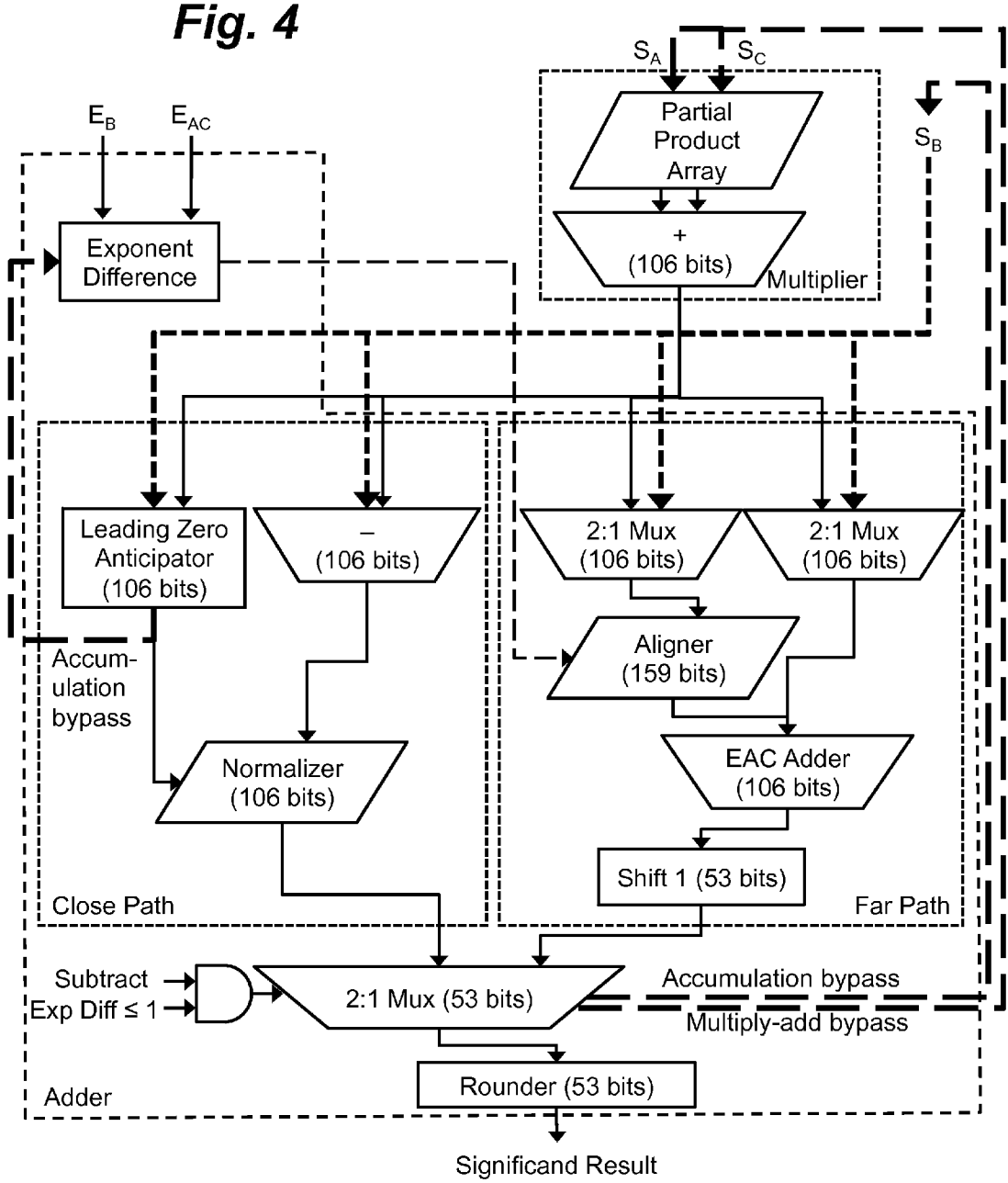
FIG. 4 illustrates a simplified datapath of the significand of the CMA design according to an embodiment of the invention.

FIG. 4 illustrates a simplified datapath of the significand of the CMA design according to an embodiment of the invention. It employs an adder with far path datapath for calculating the sum or difference when the exponent difference is greater than 1 and a close path datapath that calculates the difference when the exponent difference is ≤1, which is the only case where there could be massive cancellation and a need for a big normalizing shifter. The design has been optimized to shorten accumulation latency and handle forwarding of unrounded results (with increment signals) to shave a cycle off the accumulation and multiply-add latencies as was done in the FMA design. The next two sections discuss the details of these optimizations.

The accumulation bypass is shown as a dashed line, while the multiplication-add bypass is shown with a dotted line.

Removing the Rounding Latency Overhead

To reduce the overall latency of dependent instructions, the CMA design implements a bypass path for dependent instructions that feeds forward the unrounded result and an increment signal.

Implementing a bypass for the multiplier inputs A, C is known in prior FMA designs. However, embodiments of the present invention modify the multiplier tree to have one extra term that can be either SA if IncA signal is asserted, or SC if IncC is asserted. As for the input B, the adder part is modified to accept the inputs SB, IncB and SA×C. The incrementation of B is merged with the addition to A×C using carry save adders. The implementation of the near path and far path adders that support the increment signal is done as follows:

Close Path: The close path handles the subtraction case of $S_{A \times C}$ (106 bits) and $S_B$ (53 bits) which are aligned on the MSB. The absolute difference of two binary numbers x, y is usually calculated as follows:

$$\text{abs}(x - y) = \begin{cases} x - y = x + \overline{y} + 1, & y < x \\ -(x - y - 1) - 1 = \overline{x + \overline{y}}, & y \geq x \end{cases}$$

Therefore, the operation can be implemented using a compound adder to produce $$x + \overline{y}$$

and $$x + \overline{y} + 1$$

and a mux to choose between $$\overline{x + \overline{y}}$$

and $$x + \overline{y} + 1$$

if there is a carry out from $$x + \overline{y}.$$

Additionally, $S_B$ is incremented before the absolute difference operation if IncB is asserted. It is straightforward to merge the incrementation of $S_B$ with the absolute difference operation by right padding $S_B$ with 53 bits of $Inc_B$ (to match the width of the multiplier output), which makes adding 1 at the least significant position produce the resulting effect of incrementing $S_B$.

Following is code for close path incrementation:

```
parameter sig_width = 52; // significand width which is 52
bits for double precision
  localparam manB_width = sig_width + 1; // 53 bit mantissa
width
```

```
  localparam manAC_width = 2*manB_width; //106 bit mantissa
width for product of A and C
  input [manB_width-1:0] ManB;
  input IncB; //incrementation signal and Exponent of AxC >
Exponent of B signal
  input [manAC_width-1:0] ManAC;
  wire [manAC_width-1:0] manB_wide;
  assign manB_wide = {1'b0,ManB,{(manAC_width-manB_width-
1){IncB}}}; //pad to the right with IncB for the mantissa
  assign ExpB_gt_ExpAC_1 = ExpB[1] ^ ExpAC[1]? ~ExpB[0] &
ExpAC[0] : ExpB[0] & ~ExpAC[0]; //quickly detect that ExpB-
ExpAC=1
  assign ExpAC_gt_ExpB_1 = ExpB[1] ^ ExpAC[1]? ExpB[0] &
~ExpAC[0] :~ExpB[0] & ExpAC[0]; //quickly detect that ExpAC-
ExpB=1
  assign op1 = ExpAC_gt_ExpB_1? {1'b0 ,manB_wide} :
{manB_wide,IncB}; //shift manB by one bit based on exponent
difference
  assign op2 = ExpB_gt_ExpAC_1? {1'b0 , ManAC} :
{ManAC,1'b0}; //shift manA by one bit based on exponent
difference
  assign pp0 = {1'b0, op1[manAC_width:1] ^ ~op2[manAC_width:1]
, op1[0] ~ op2[0] ^ IncB}; //xor gate for creating sum partial
term
  assign pp1 = { op1[manAC_width:1]&~op2[manAC_width:1] ,
(op1[0]&IncB | ~op2[0]&IncB | op1[0]&~op2[0]) , 1'b0); //and
gate for creating carry partial term
  // use a compound adder to produce sum and sum+1
  assign {co, sum0} = pp0+pp1;
  sum1 = pp0+pp1+1;
  assign absdiff = co? sum1: ~sum0;
```

Figure 5:
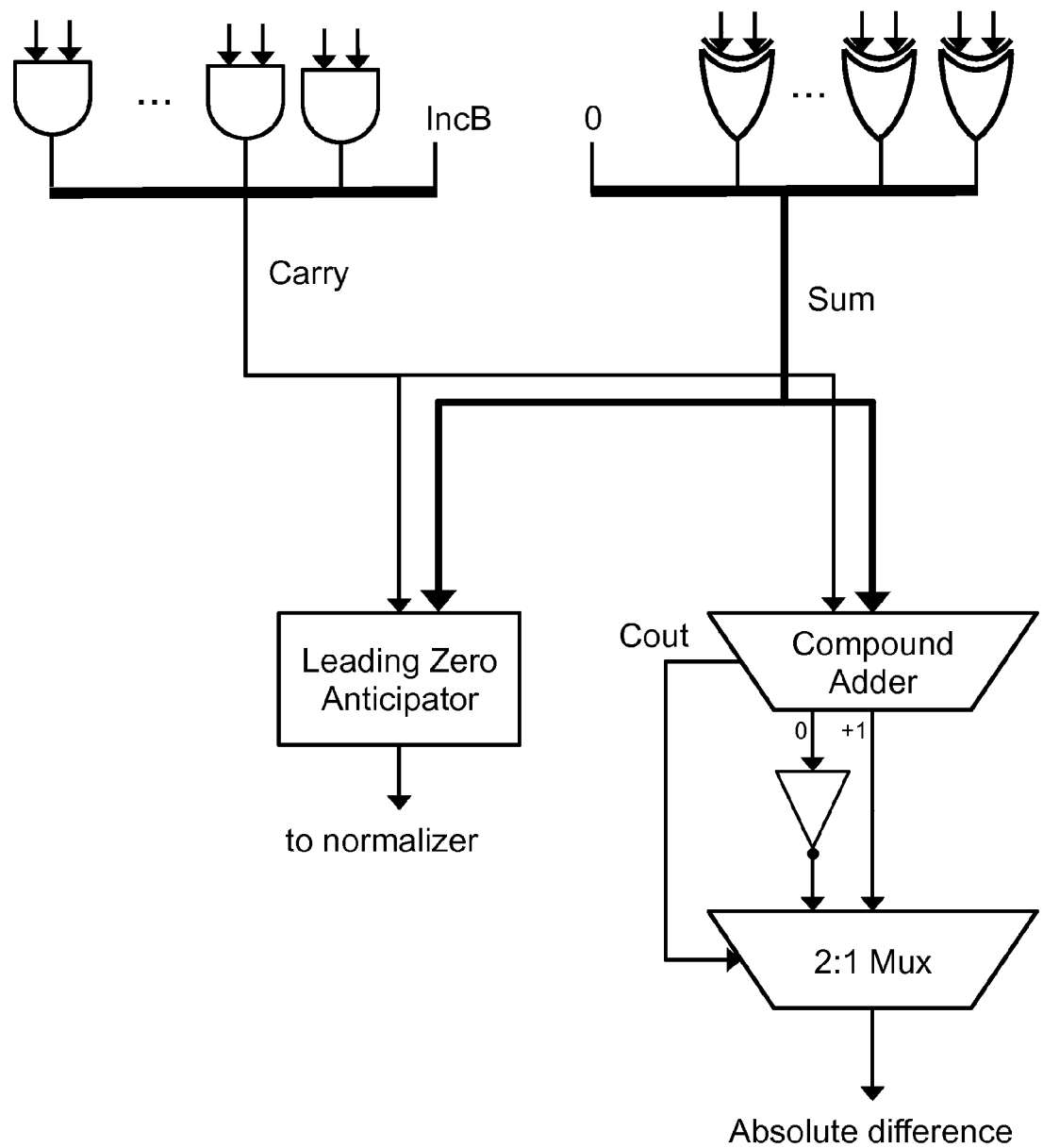
FIG. 5 is a diagram illustrating the implementation of the logic for close path incrementation.

FIG. 5 is a diagram illustrating the implementation of the above logic for close path incrementation.

Far Path:

The far path handles addition and subtraction when the exponent difference is greater than 1. The addend with the bigger exponent ($S_{big}$) can be as wide as 106 bits. The addend with the smaller exponent ($S_{small}$ is shifted right by the amount of exponent difference and becomes 159 bits wide after shifting. In case of subtraction, $S_{small}$ is inverted before being fed to the adders. A compound adder of 106 bits summing $S_{big}$ and $S_{small}$ that produces sum and sum+1 is sufficient for calculating the sum and difference. Finally, only the uppermost 53 bits of the result is retained after normalization (possible right shift in case of addition and left shift in case of subtraction) and guard and sticky bits are calculated. To support incrementation of $S_B$, the design is modified by having an adder that produces sum, sum+1, and sum+2. Choosing between the three results gives the equivalent result of incrementing $S_B$ before the add operation. The correct result is chosen according to the following rules:

When ExpB>ExpA×C:

$S_B$ is right padded with $Inc_B$. and $S_{big} = \{S_B, (53)\{Inc_B\}\}$ $S_{small} = \{S_{A \times C}, 53'b0\} \gg (Exp_B - Exp_{A \times C})$ If $Inc_B$ is asserted, the result of addition becomes sum+1, while the result of subtraction becomes sum+2.

When ExpA×C>ExpB:

$S_B$ is the smaller fraction, and in case of incrementation, we need to add 1 to the LSB of $S_B$ which is then fed to the alignment shifter. To combine the incrementation with alignment and add operation we pad the lower bits with $Inc_B$ so that after shifting, adding 1 to the LSB is still equivalent to incrementing $S_B$ before shifting. Logically for $S_{small}$ we will create a 159 operand to feed into the adder, and we will add the carry at the LSB. So $S_{big} = S_{AC}$ $S_{small} = \{S_B, (106)\{Inc_B\}\} \gg (Exp_{A \times C} - Exp_B)$ Since $S_{big}$ is zero for the 53 LSBs, carry-in to the 106 bit adder is generated by carry-in ANDed with the lower 53 bits of $S_{small}$ which is used to choose between sum and sum+1 in the case of addition. This handles all the shift cases. As for subtraction, $S_{small}$ is inverted before being fed to the adder. Since $$\overline{S_{small}} = -(S_{small}+1)$$

the result of subtraction is always sum if IncB is asserted.

Figure 6:
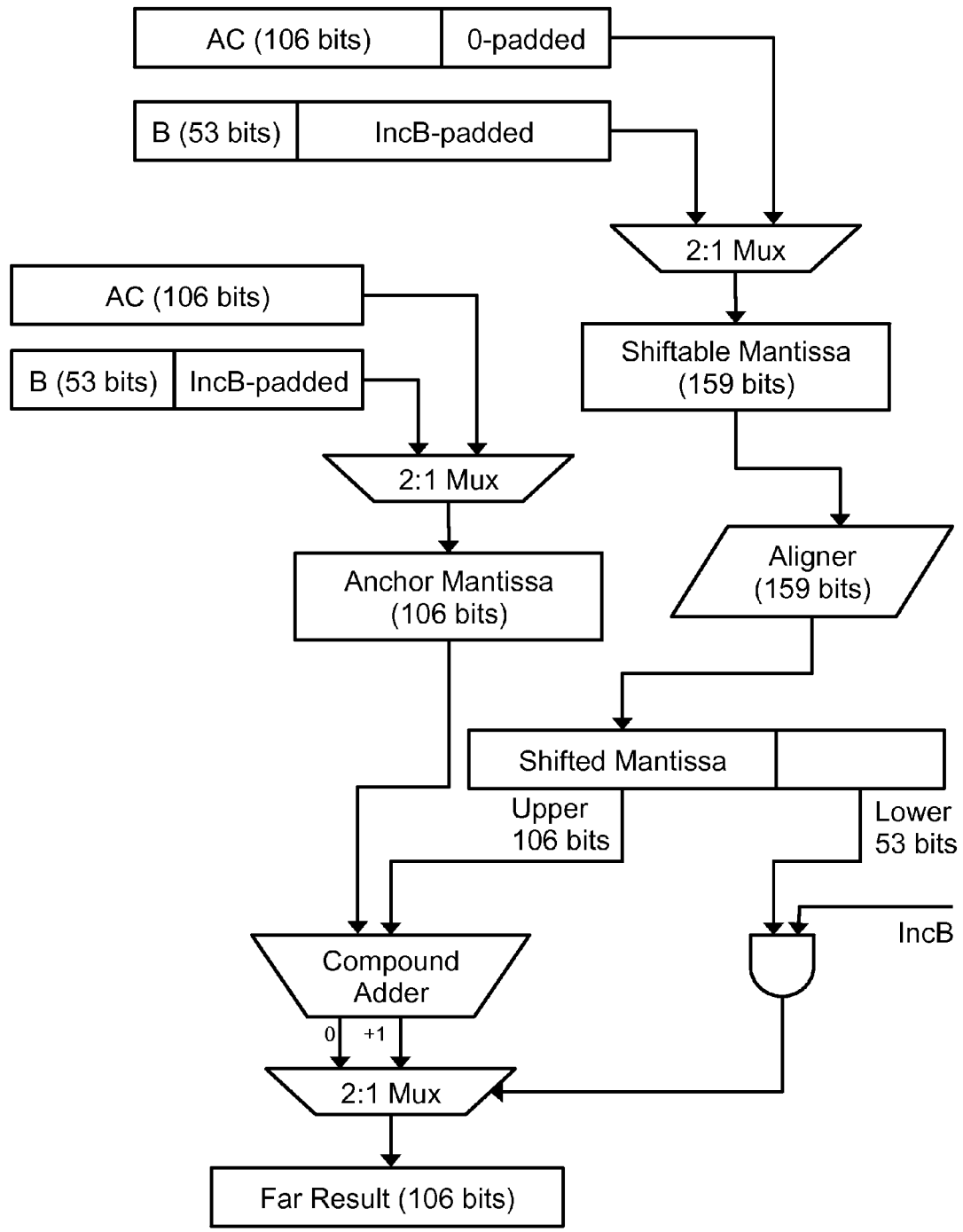
FIG. 6 is a block diagram illustrating the above-described combining of shifting and addition in the far path.

FIG. 6 is a block diagram illustrating the above-described combining of shifting and addition in the far path.

Below is simplified verilog code for the far path incrementation (omitting for simplicity the subtraction case and getting the absolute value of the result using End-Around-Carry adder).

```
parameter sig_width = 52; // significand width which is 52 bits for double precision
    localparam manB_width = sig_width + 1; // 53 bit mantissa width
    localparam manAC_width = 2*manB_width; //106 bit mantissa width for product of A and C
    input [manB_width-1:0] ManB;
    input IncB, ExpAC_gt_ExpB; //incrementation signal and Exponent of AxC > Exponent of B signal
    input [manAC_width-1:0] ManAC;
    wire [manAC_width-1:0] biggerFraction; // the fraction with the bigger exponent
    wire [manAC_width+manB_width-1:0] smallerFraction; // the fraction with the smaller exponent
    assign biggerFraction = ExpAC_gt_ExpB ? ManAC : (1'b0,ManB,{(manAC_width-manB_width-1){IncB}}};
    assign shift_in = ExpAC_gt_ExpB ? (1'b0, ManB,{(manAC_width-1){IncB}}} : {ManAC,{(manB_width){1'b0}}};
    assign smallerFraction = shift_in >> shift_amount ;
    assign ci = IncA & (&smallerFraction[manB_width-1:0]); // carry in to addition operation is ANDing of all the lower bits
    result = smallerFraction[manAC_width+manB_width-1:manB_width] + biggerFraction + ci ;
```

Optimizing the Accumulation Loop

The accumulation loop can be reduced by noticing that the result exponent is known to within ±1 in advance of the result mantissa in carry save format as an output of the adder. In the near path, the exponent is the difference between the larger exponent and the leading zero anticipator (LZA) count. In the far path, the exponent is just the bigger exponent of the two addends, but might be incremented if a late right shift is needed in case of addition or decremented if a late left shift is needed in case of subtraction.

Figure 7:
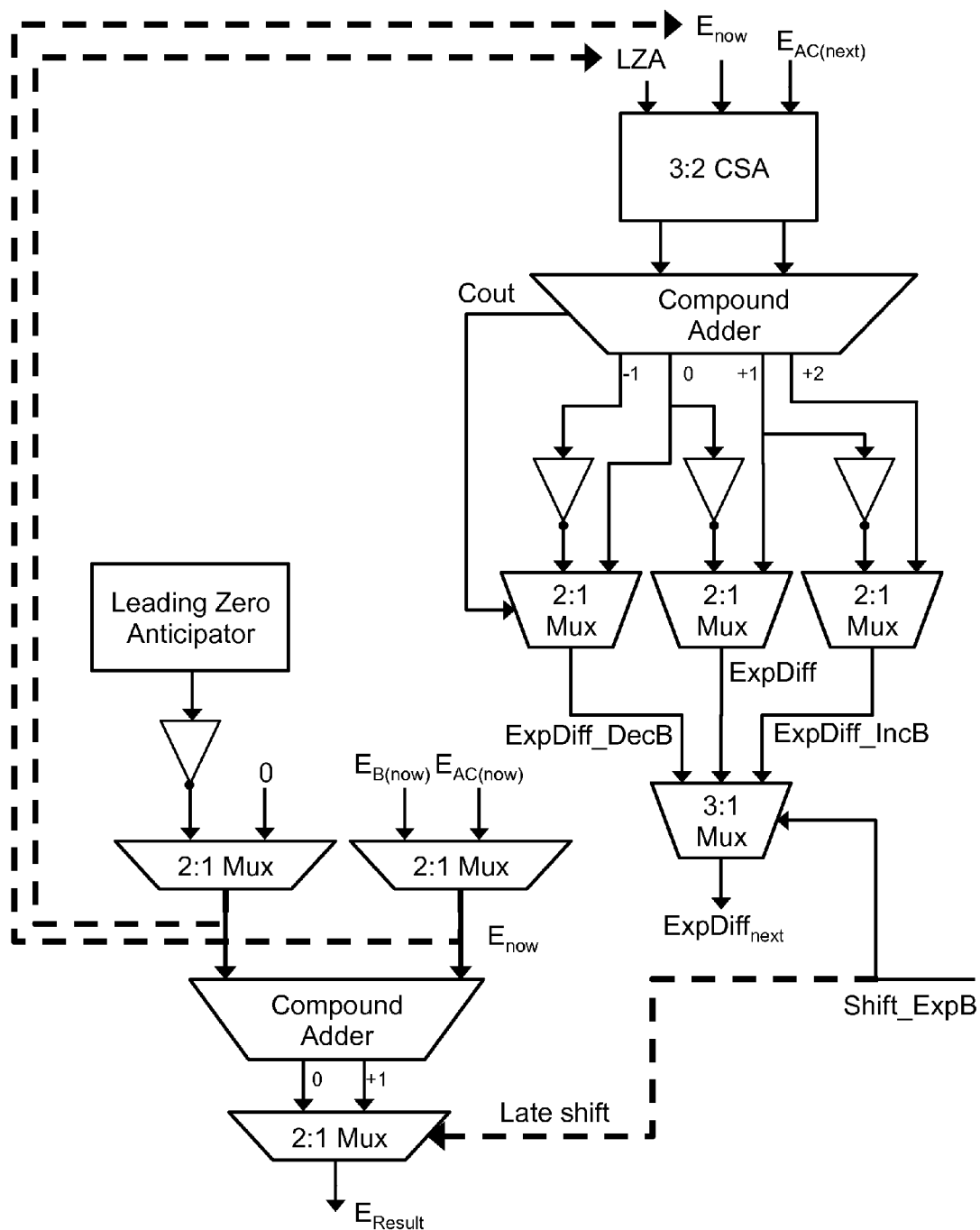
FIG. 7 is a simplified exponent datapath indicating the feedback loops to achieve reduced accumulation latency.

FIG. 7 is a simplified exponent datapath indicating the feedback loops to achieve reduced accumulation latency. Since the output of the final normalization (Shift_ExpB) is not known, it takes the output of the current operation ($E_{now}$) and the output of the LZA and combine them with the next multiplier output ($E_{AC(next)}$) to compute the next exponent difference (ExpDiff$_{next}$). Since $E_{now}$+LZA can be off by one, we need to compute both options, and we need to compute the absolute value of the result (the 2-1 mux driven by $C_{out}$). An exponent difference unit takes as input $E_{now}$, LZA, and $E_{AC(next)}$. It computes abs($E_{now}$+LZA-$E_{AC(next)}$+x), where x=-1, 0, 1, corresponding to the exponent difference if the last result is normalized to the left, not shifted or normalized to the right. A late select based on normalization of the mantissa is used to select the correct exponent difference for next stage.

Further optimization of the accumulation loop is provided by the staggering of the exponent and mantissa datapaths, as described earlier in relation to FIG. 3.

Handling Denormals

The cascade design handles denormals at the adder input without a problem. It also produces denormal numbers correctly when they are the result of the operation. However, multiplying a denormal with a normal number can result in an unnormalized input to the adder which could generate cancellations in the far path and therefore require normalization. To handle this case, a special exception is raised and a normalization stage after the multiplier is used to normalize the product.

Those skilled in the art will appreciate that the specific embodiments of the invention described above are illustrative in nature, and the invention encompasses variations of the details of these embodiments in accordance with the principles of the invention. Accordingly, the scope of the invention is to be determined from the claims and their legal equivalents.

The invention claimed is:

1. A floating-point fused multiply-add (FMA) unit embodied in an integrated circuit, wherein the FMA unit comprises:
   a) a multiplier circuit with floating point inputs A and C and floating point output A*C;
   b) an adder circuit connected to the output of the multiplier circuit, wherein the adder circuit adds the floating point output A*C to a floating point input B producing a result A*C+B; wherein the adder circuit comprises:
      i) an exponent difference circuit implemented in parallel with the multiplier circuit;
      ii) a close path circuit implemented after the exponent difference circuit;
      iii) a far path circuit implemented after the exponent difference circuit;
      iv) a 2:1 Mux circuit connected to outputs of the close path circuit and the far path circuit; and
      v) a rounder circuit connected to an output of the 2:1 Mux circuit;
   c) accumulation bypass circuits forwarding an unrounded output of the 2:1 Mux circuit to inputs of the close path circuit and the far path circuit, and forwarding an exponent result in carry save format to an input of the exponent difference circuit; and
   d) a multiply-add bypass circuit forwarding the unrounded output of the 2:1 Mux circuit to the floating point inputs A and C of the multiplier circuit.

2. The FMA unit of claim 1 wherein the floating point output A*C has a mantissa width double that of A and of C, and wherein the floating point output A*C has a mantissa width double that of B.

3. The FMA unit of claim 1 wherein the adder circuit further comprises a clock gating circuit to choose between the close path circuit and the far path circuit.

4. The FMA unit of claim 1 wherein the accumulation bypass circuits are staggered with respect to each other such that the exponent datapath starts earlier than the mantissa datapath and an exponent result is calculated earlier than a mantissa result in carry save format to be forwarded for a next dependent calculation.

5. The FMA unit of claim 1 wherein the far path circuit combines incrementation with shifting and addition datapath.

6. The FMA unit of claim 5 wherein the unrounded output is right padded with ones in case of incrementation before being fed to a shifter or adder.

7. The FMA unit of claim 5 wherein circuitry in the adder circuit uses carry propagation as if the unrounded result had been incremented before shifting and addition.

8. The FMA unit of claim 1 wherein clock gating is performed on the far path if there is a subtraction and the exponent difference is 0 or 1, and wherein clock gating is performed on the close path if the exponent difference is greater than 1 or there is an addition.

9. The FMA unit of claim 1 wherein the exponent result comprises a first component and a second component, wherein the first component of the exponent result is an output of the 2:1 mux that selects the larger exponent between ExpAC and ExpB, and wherein the second component of the exponent result is an output of 2:1 mux that selects between an inverted version of leading zero anticipator output if the result is forwarded from the close path circuit and zero if the result is forwarded from the far path circuit.

* * * * *